United States Patent [19]

Dogliotti

[11] 4,165,456

[45] Aug. 21, 1979

[54] DEVICE FOR HEATING TO CONSUMPTION TEMPERATURE A LIQUID COMMESTIBLE PRODUCT SEALED IN A DISPOSABLE CONTAINER

[75] Inventor: Amilcare Dogliotti, Alba, Italy

[73] Assignee: P. Ferrero & C. S.p.A., Alba, Italy

[21] Appl. No.: 947,323

[22] Filed: Oct. 2, 1978

[30] Foreign Application Priority Data

Oct. 14, 1977 [IT]   Italy .............................. 69296 A/77
May 8, 1978 [IT]    Italy .............................. 68041 A/78
May 18, 1978 [IT]   Italy .............................. 68136 A/78

[51] Int. Cl.² .......................................... H05B 3/68
[52] U.S. Cl. ..................................... 219/449; 219/214;
219/432; 219/434; 219/435; 219/441; 219/452;
219/518; 219/530
[58] Field of Search .............. 219/214, 218, 444, 445,
219/446, 447, 448, 449, 450, 452, 453, 456, 462,
518, 519, 521, 530, 430, 432, 433, 434, 435, 439,
441

[56] References Cited

U.S. PATENT DOCUMENTS

| | | | |
|---|---|---|---|
| 2,532,014 | 11/1950 | Davis | 219/214 X |
| 2,551,219 | 5/1951 | Peters et al. | 219/446 X |
| 2,994,758 | 8/1961 | Kelly | 219/452 X |
| 3,384,735 | 5/1968 | Linger | 219/456 |
| 3,384,736 | 5/1968 | Nowosielski | 219/456 |
| 3,440,406 | 4/1969 | Sego, Jr. | 219/444 |
| 3,586,824 | 6/1971 | Barney | 219/452 |
| 3,760,149 | 9/1973 | Harsanyi | 219/518 X |
| 3,909,592 | 9/1975 | Eide | 219/462 |
| 4,034,200 | 7/1977 | Visagie | 219/518 X |
| 4,070,670 | 1/1978 | Chen | 219/452 X |

Primary Examiner—Volodymyr Y. Mayewsky
Attorney, Agent, or Firm—Sughrue, Rothwell, Mion, Zinn and Macpeak

[57] ABSTRACT

A presser member, into which the container is loaded, is manually depressable against the action of its return spring into pressure-contact engagement of the container with an electric heating plate containing a PTC heating resistor. The depression stroke produces closure of a switch to energize both the PTC resistor and an electromagnet keeping the presser member in its depressed condition. A timer circuit opens the switch at the elapse of a prealably experimentally determined heating time during which the liquid reaches its consumption temperature, whereby heating is terminated and the return spring lifts the pressure member with the container to unloading position. The heating process comprises a fast initial heating period until the PTC resistor temperature reaches a predetermined maximum value, and the consumption temperature of the liquid is reached by intermittently energizing the PTC resistor at short intervals (fraction of a second) in a high-temperature range directly adjacent said maximum value without exceeding the latter.

13 Claims, 19 Drawing Figures

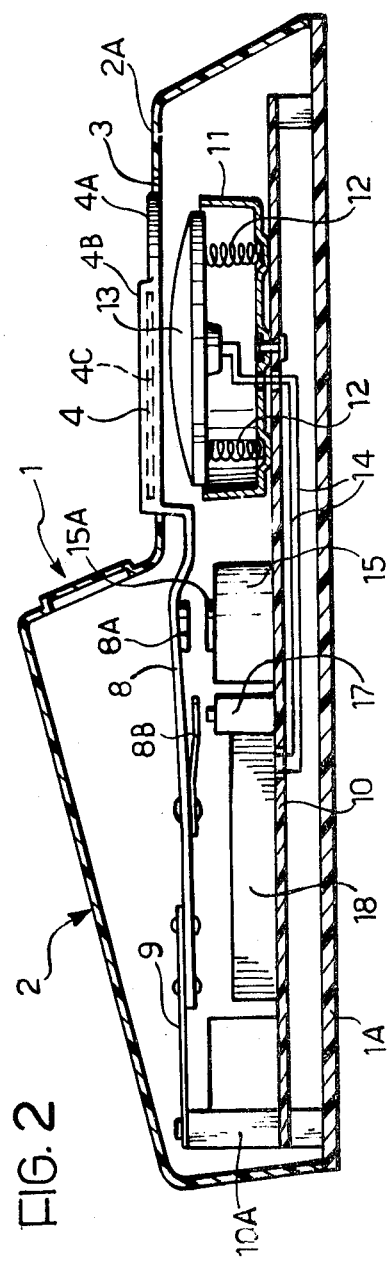
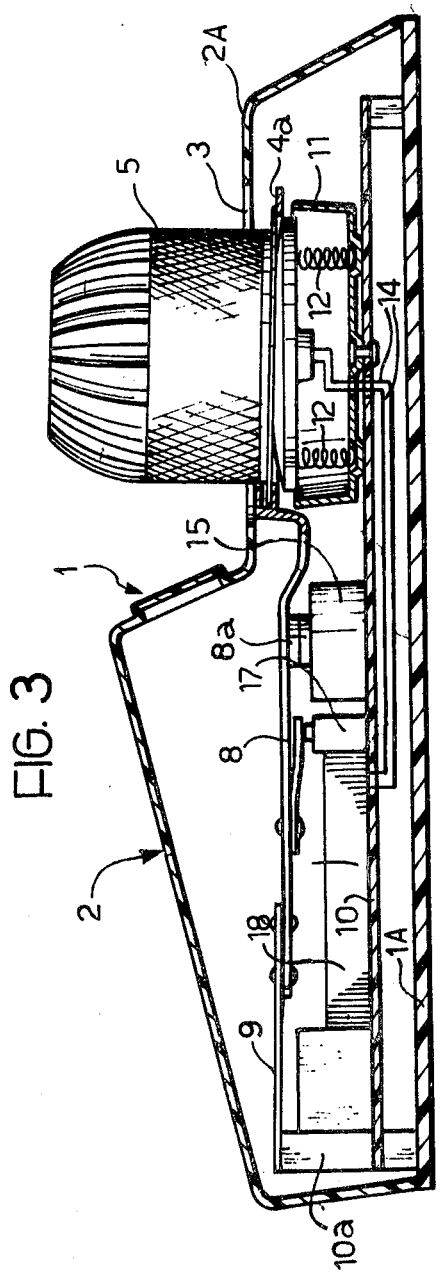

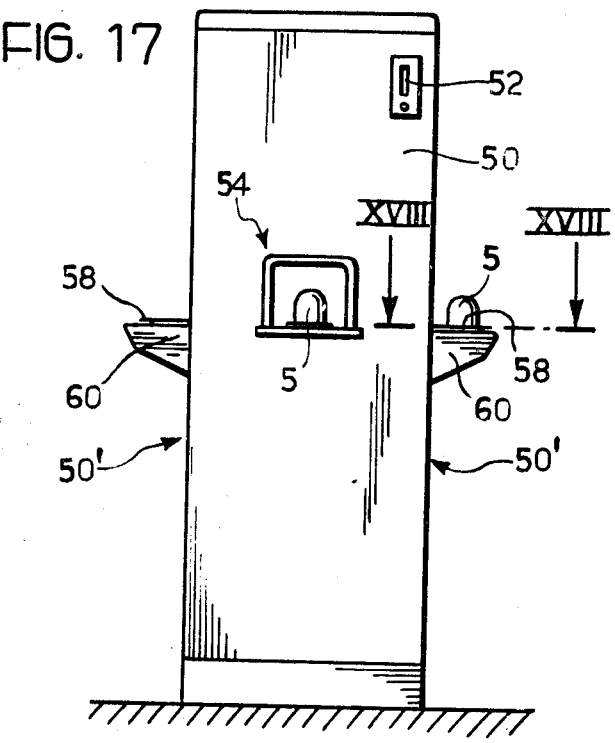
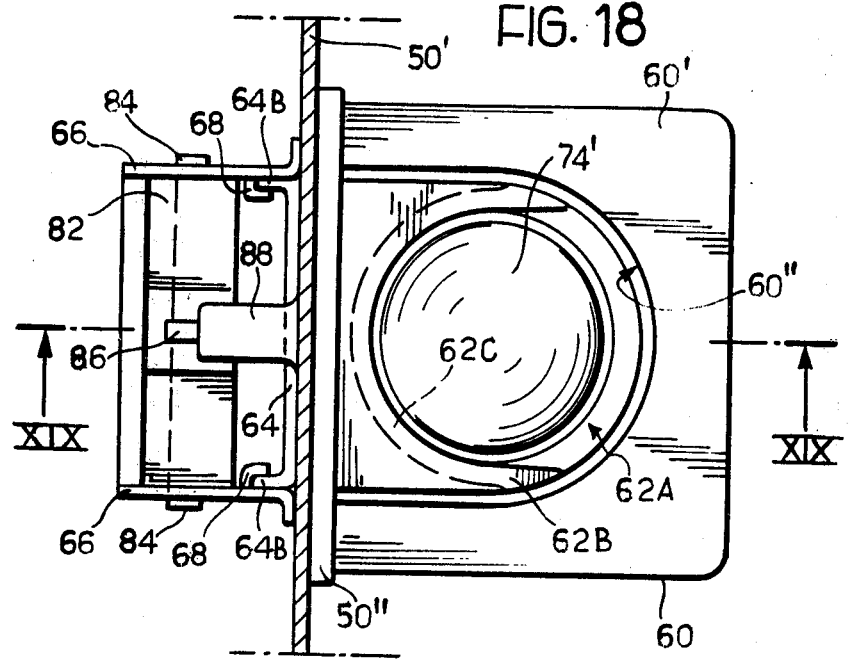

DEVICE FOR HEATING TO CONSUMPTION TEMPERATURE A LIQUID COMMESTIBLE PRODUCT SEALED IN A DISPOSABLE CONTAINER

This invention relates to the art of heating a liquid commestible product in a container by means of a heating plate incorporating an electric heating resistor.

The term "liquid" as used herein includes both beverages (e.g. coffee, tea, punch, grog and similar) and pourable aqueous products such as soups or sauces.

In accordance with the background of this invention, it would be convenient to commercialize individual portions of a liquid commestible product sealed in disposable containers (preferably of plastics), and to heat the so seald product to its consumption temperature at the appropriate moment. For example, it would be advantageous to commercialize individual portions of the so-called "Express Coffee" (or "Italian Coffee") sealed in cups or other shaped containers of a food-grade polypropylene or other suitable plastics, and to provide a heating device capable of heating the so sealed coffee to its consumption temperature (preferably about 50° C.) within an extremely short time, such as 40–50 seconds or less.

The main object of this invention is to provide such heating device. Further objects and advantages will be apparent from the following description.

In accordance with the main feature of this invention, there is provided a device for heating to consumption temperature a liquid commestible product while the latter is sealed in a disposable shaped container having a heat-conductive wall portion, characterized in that it comprises:

(i) a normally open electric switch,
(ii) a yieldably supported heating plate having a heating face and a PTC heating resistor energizable via said switch,
(iii) a spring-biased presser member formed with a container-receiving seat located above said heating face, said member being manually depressable against the action of its bias spring from a loading position spaced above said face to a working position to bring said wall portion of the container into forced pressure-engagement with the heating face,
(iv) the said normally open electric switch being closable by displacement of the presser member to said working position,
(v) a fixed electromagnet unit energizable by closure of the switch and a movable armature for said electromagnet unit carried by the presser member in a mutual relation such that the presser member is kept in its working position by the electromagnet unit when the latter is energized,
(vi) an electric control circuit controlling heating current supply to the PTC resistor from said switch when the latter is in closed condition, said control circuit comprising circuit means sensitive to the instantaneous resistance value of the PTC resistor in energized condition thereby to interrupt the said heating current supply each time the temperature of the resistor rises to a predetermined maximum value and to restore said current after a fraction of the total heating time,
(vii) and a timer circuit triggerable by the closure of said switch, determining the total heating time and arranged to open said switch at the elapse of the total heating time. With this arrangement, what is necessary for the user is to introduce the container into the presser member in the upper (loading) position of the latter, with the heat-conductive wall portion turned downwardly, and to depress the presser member to its lower (working) position. The heating process follows automatically and the presser member is returned to its upper position by its bias spring at the moment at which the liquid in the container has at least substantially reached its consumption temperature, so that the container is lifted and the user may withdraw the container from the presser member.

It is to be expressly noticed that there is no "temperature maintainance" period as the timer circuit definitely interrupts heating when the consumption temperature is reached or is about to be reached.

The container preferably is a cup of plastics with an outturned circumferential flange at its open end, and the product therein is sealed by a flat, heat-conductive cover comprising an aluminium foil heat-bonded to the flange. Also preferably, the heating face of the heating plate is a substantially circular, convex surface. The container is loaded upside down into the presser member, so that its cover of aluminium foil is subsequently brought into forced pressure contact with the said convex face whereby the resilient means supporting the heating plate are stressed. The convex face initially slightly inwardly flexes the cover under the action of said resilient means, and the flexure is substantially completed (and the cover substantially matches the domed profile of the heating face) as soon as heating is started, due to natural tendency of the cover to dome at increasing temperatures, whereby extraordinarily effective heat-transfer conditions are established.

Still preferably, the said presser member and seat comprise an annular bearing portion for the container substantially coaxial with the heating plate, a fork-shaped flange fast with and overlying a part of said bearing portion, and an inwardly open groove formed jointly by said bearing portion and flange to provide a half-circumferential pocket capable of receiving the flange formed on the container. In this case, and as will be better shown hereinafter, when the presser member is in its loading condition, the container may be horizontally slid by the user on the said bearing portion until the container flange engages by its half-circumference in the said groove, so that the container cannot be removed from the presser member by displacement in either of the two opposite vertical directions. It is then sufficient to exert a manual downward pressure on the container, rather than on the presser member, to depress the latter to its working condition at which the container cover is inwardly domed (as described hereinbefore) by the heating plate. It will be readily realized that this pressure contact along a domed surface keeps the container against horizontal displacements during heating.

According to an embodiment of the invention, the presser member constitutes the free end of a lever arm having its opposite end fast with a leaf spring, which latter supports the arm and constitutes the bias spring for the presser member. As the presser member is depressed to its working condition the spring is stressed so as to be able to restore said member to its upper (loading) position when the switch is opened and the electromagnet unit is de-energized. Also, in this embodiment, the armature preferably comprises a ferromagnetic bar fast with said lever arm and crossing the latter horizontally, and the electromagnet unit comprises two electromagnets operatively arranged beneath the respective end portions of the bar, whereby the presser member may be kept in its working position by the joint attraction force of the two electromagnets. Moreover, the switch is preferably located beneath the said lever arm at a distance enabling the lever arm to close the switch when the presser member is depressed to its working condition.

According to a second embodiment, the heating device comprises a substantially vertical fixed frame wall and a slide vertically slidable on said wall, the presser member and armature being rigid with said slide in an arrangement wherein the presser member extends from the slide to its location above the heating plate. In this case, the movements of the presser member from its loading position to its working position and vice-versa are vertical translational displacements, rather than swinging movements as in the former case. Preferably, the presser member and armature are carried by the lower end of the slide, the fixed electromagnet unit comprises an electromagnet operatively located beneath the armature, and a helical compression spring encircling the electromagnet is provided to act on the armature in upward direction thereby to bias the slide to an upper stop position at which the presser member is in its loading condition.

The use of PTC resistors in the art of heating liquids in kitchen pots and similar vessels is known in the art. The general trend is to incorporate in a heating plate a PTC heating resistor in series with a conventional (non-PTC) heating resistor. Arrangements of this kind are convenient in case wherein it is necessary to maintain the liquid at elevated temperature for an indefinitely long time. In contrast therewith, preferably, in the device according to this invention the PTC resistor is the sole heating resistor in the heating plate, so that an accurate control of the heating process is possible with the view to not overheat and damage the disposable container. It is desirable, in the device according to the invention, that the PTC resistor may quickly cool down after each interruption of the heating current by the aforementioned control circuit; the presence of an additional heating resistor in series with the PTC resistor would be in direct contrast with this requirement. Also, for the same reason, the thermal capacity of the heating plate in this device is preferably as low as practically possible. Rather, it is recommendable to use a lightweight thin heating plate, capable of quickly losing its accumulated heat, rather than to store the latter.

The time circuit advantageously comprises means for selectively setting the total heating time. Further information on this detail will be given hereinafter.

As to the control circuit associated with the PTC resistor, various possibilities will be apparent to those skilled in the art upon reading the present specification. However, according to a preferred aspect of this invention, the aforesaid switch has connected to its outlet a Wheatstone bridge in which one of the four branches comprises the PTC heating resistor, and the said control circuit is connected to the ends of the measuring diagonal of the bridge. The branch of the bridge opposed to the PTC resistor preferably comprises a variable resistor for balancing the bridge. Since a definite relationship exists between the temperature of the PTC resistor and its instantaneous resistance value, the control circuit is in a position to pick up from the Weatstone bridge electrical signals indicative of said instantaneous resistance values and to exploit said signals for the purposes indicated herein.

According to a preferred embodiment, a controlled rectifier is connected in series with the energizing diagonal of the Weatstone bridge with respect to the switch, whereby the bridge is energized by direct current pulsations, rather than by alternating current, so that direct current voltage signals are available at the ends of the measuring diagonal, and the output of the control circuit is connected to the control terminal of said controlled rectifier to inhibit the latter when the temperature of the PTC resistor reaches its predetermined maximum value. Direct current voltage signals make the design of the control circuit relatively simple and reliable with the use of circuit sections disclosed by professional literature.

Further details and preferred embodiments of the invention will be now described with reference to the accompanying drawings, wherein:

FIG. 2 is a longitudinal cross-sectional view of the device along line II—II of FIG. 1 in its inoperative condition;

FIG. 3 is a cross-sectional view similar to FIG. 2, showing the device in operating condition;

FIG. 17 is a front elevational view of a beverage dispensing apparatus comprising another embodiment of the device according to this invention;

FIG. 18 is a fragmentary cross-sectional view on line XVIII—XVIII of FIG. 17 showing said another embodiment in plan view.

The device 1 shown in FIGS. 1–5 comprises a casing formed by a flat rectangular bottom plate 1A and a stepped cover 2 in which the upper wall comprises a planar, horizontal, forward portion 2A. The latter has a circular aperture 3 therein, in which a presser member 4 is depressable downwardly through a stroke of about 8–10 mm.

Figure 5:
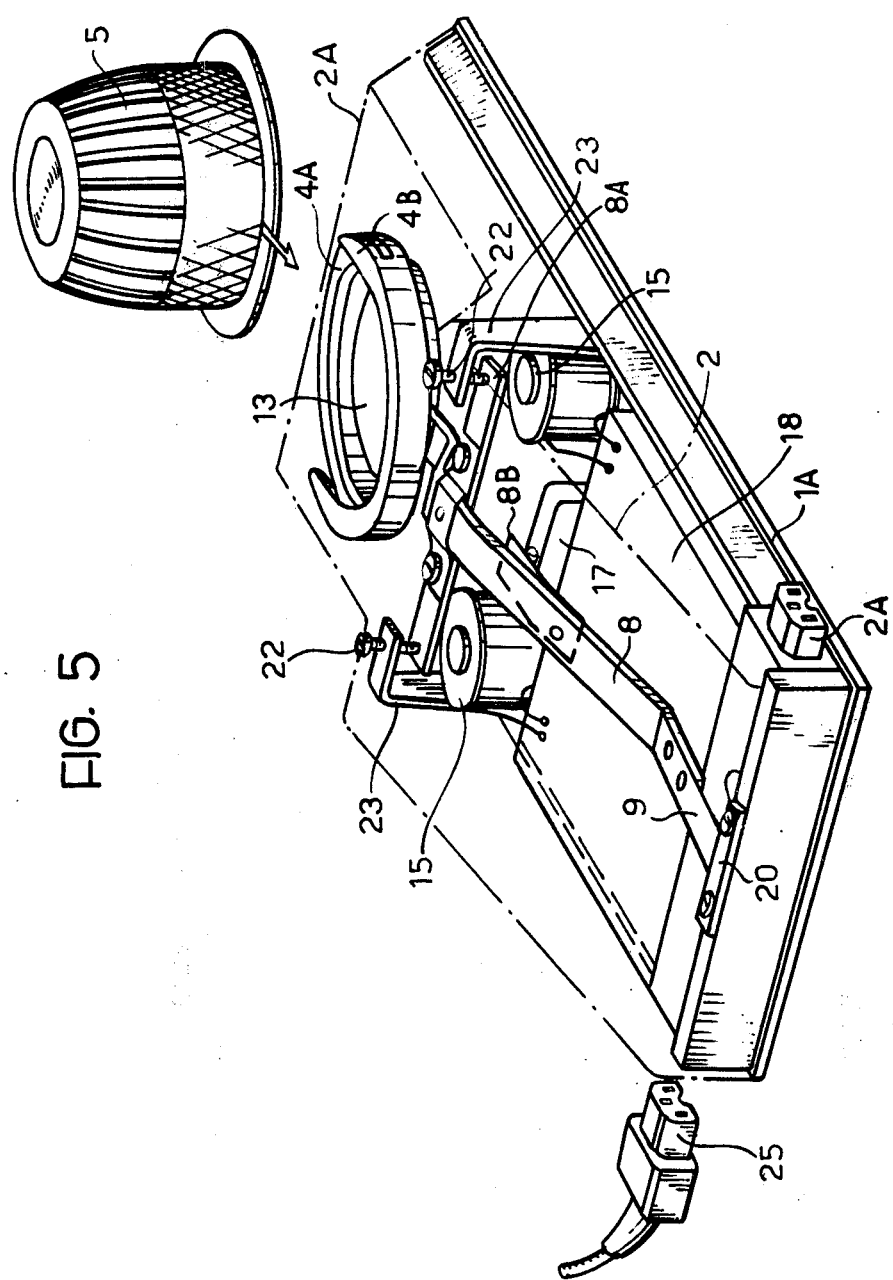
FIG. 5 is a perspective view of the device with the cover removed.

The presser member 4 is designed to receive a circular cut 5 shown in FIG. 5, vacuum-formed form a sheet of food-grade plastics and comprising a planar flange 5A encircling its open end. The cup is sealingly closed by a cover 6 of aluminium foil heat-bonded to the flange 5A and is substantially filled with a beverage 7 such as "express coffee." The diameter of the cup is advisably about 5 cm, and the flange protrudes therefrom by about 3-4 mm, the amount coffee therein being about 70-80 ml.

The presser member 4 comprises a planar, rigid circular ring 4A of sheet metal, the upper face of which is normally substantially flush with the wall portion 2A, said ring being substantially concentrical with the aperture 3. An inwardly directed semicircular flange 4B protrudes from the ring 4A, so as to extend overneath the ring along the rear half-circumference of the latter and to jointly form with the ring an inwardly open semicircular groove 4C. The inner diameter of the groove 4C corresponds to the outer diameter of the flange 5A of the cup, while the inner diameters of the ring 4A and its flange 4B correspond to the outer diameter of the cup 5. Thus, in normal (inoperative) position of the presser member, the cup 5 may be superposed upside down on the fore end of the wall portion 2A and slid into the fork formed by flange 4B until the flange 5A of the cup engages by its half-circumference into the groove 4C. The width of the latter is slightly only greater than the combined thickness of the flange 5A and cover 6 of the cup, so that the cup is firmly retained by the presser member against vertical displacements with respect to the pressure member.

The pressure member 4 constitutes the free end of a rigid lever arm 8, the opposite end of which is riveted to an end of a leaf spring 9. A base plate 10 of insulating material is fixed on the bottom plate 1A and has a rigid support 10A on its rear end to which the rear end of the spring 9 is rigidly clamped by a clamp 20 (FIG. 5).

Figure 1:
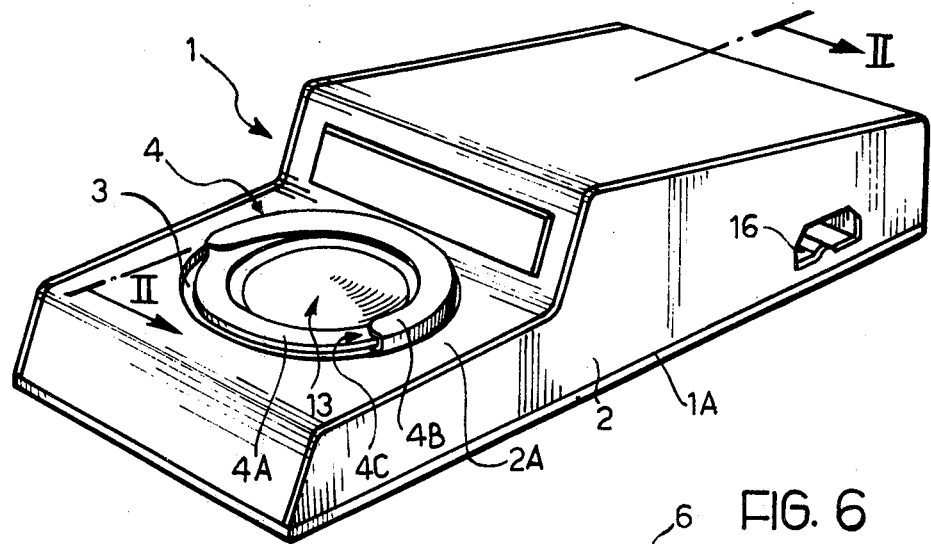
FIG. 1 shows in perspective view a desk-type of a device according to this invention.
Figure 6:
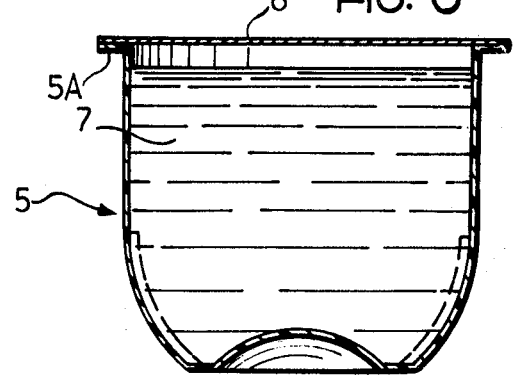
FIG. 6 is an axial cross-sectional view of a container suitable for use with the device of FIGS. 1–4.
Figure 4:
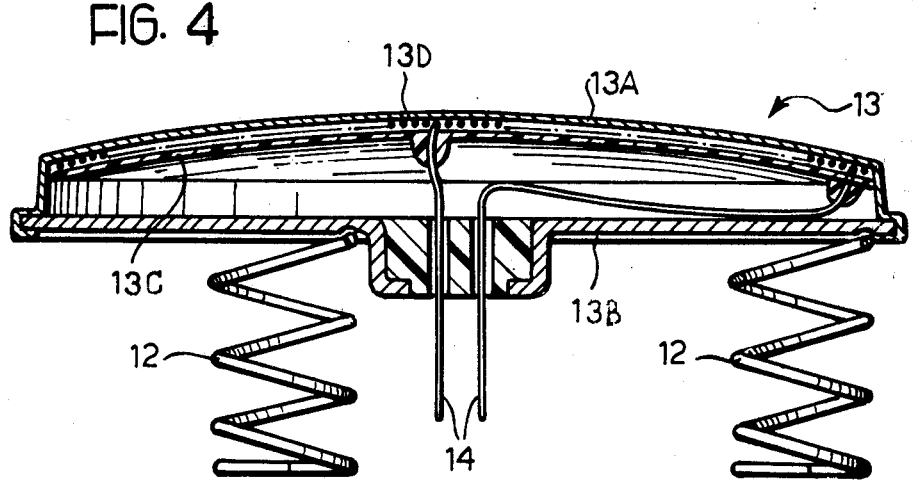
FIG. 4 is an axial cross-sectional view of the resiliently supported heating plate in the said device.

Coaxially with the aperture 3 and beneath the latter is riveted to the base plate 10 a cup-like support 11 of sheet metal having fitted to its bottom three vertically extending identical helical compression springs 12 constituting a resilient tripod for a horizontal heating plate 13 coaxial with the aperture 3. As is shown in FIG. 4, the heating face 13A of the heating plate is convex upwardly and is formed by a light-weight circular stamping of aluminium sheet having a circumferential downward flange bonded to the circumference of a rigid sheet metal disk 13B. A convex disk 13C is fitted from the inside to the heating face 13A and a PTC heating resistor 13D in the form of a spiral is blocked between the disk 13C and heating face 13A with the interposition of disks of mica (not shown). Obviously, the turns of the spiral are electrically insulated therebetween. The spiral may be formed from a nickel wire of a diameter of 0.25 mm, of a length providing a resistance of about 10 ohms at room temperature. The resistance increases with temperature; for example, at temperatures of 300° C. and 400° C. the resistance values of the spiral are about 30 and 40 ohms, respectively. Thus, the power dissipated at 110 V(c.c.) by the resistor is about 1.2 kW at room temperature and about 350 W at 350° C. It further sinkd to about 280 W at about 500° C. The resistor 13D is energized through leads 14 (FIG. 4).

The lever arm 8 has rigidly fixed thereto a flat bar 8A of ferromagnetic material, horizontally crossing the arm and providing an armature for a pair of electromagnets 15 fixed to the base plate 10 beneath the respective ends of the bar 8A. The pole pieces of the electromagnets cooperating with the bar are denoted by 15A in FIG. 2. The spring 9 tends to rise the arm 8 with its presser member 4; in order to secure that bearing ring 4A for the container 5 is flush with the wall portion 2A, as stated hereinbefore, in inoperative (loading) position of the presser member, adjustable stop screws 22 (FIG. 5) are provided, carried by fixed uprights 23 and cooperating with the respective end portions of the bar 8A.

Energization of the electromagnets 15 and PTC heating resistor 13D is controlled by a microswitch 17 via a system of circuits enclosed in a box 18, both fastened to the upper face of the base plate 10 beneath the lever arm 8. The switch 17 is normally open; preferably, the arm 8 closes the switch indirectly, by means of a light leaf spring 8B riveted to the arm. A socket 16 (FIG. 1) is provided at one lateral side of the device for a plug 25 (FIG. 5) for connection to alternating current mains, e.g. at 220 V. A similar plug 24 (FIG. 5) projects from the opposite side of the device in transverse alignment with the socket, so that the device may be directly coupled with a further identical device in a side-by-side relationship.

In operation, a cup 5 is loaded into the presser member 4 as described hereinbefore and pushed downwardly. The heating plate 13 yields under the pressure exerted thereon by the cover 6 of the cup and the springs 12 are compressed until the armature 8A comes into contact with the polar pieces of the electromagnets 15 while at the same time the microswitch 17 is closed by the arm 8 (FIG. 3). Starting from this moment the arm 8 is kept in its depressed condition by the electromagnets and the heating process is performed by the heating plate 13 until the timer circuit (mentioned hereinbefore) interrupts the current supply to electromagnets 15; at the latter moment the arm 8 is free to spring back to its original position under the action of the spring 9, whereby the microswitch 17 opens and the presser member 4 raises the cup 5 to its original position at which it slid out of the member 4 by the user.

Figure 7:
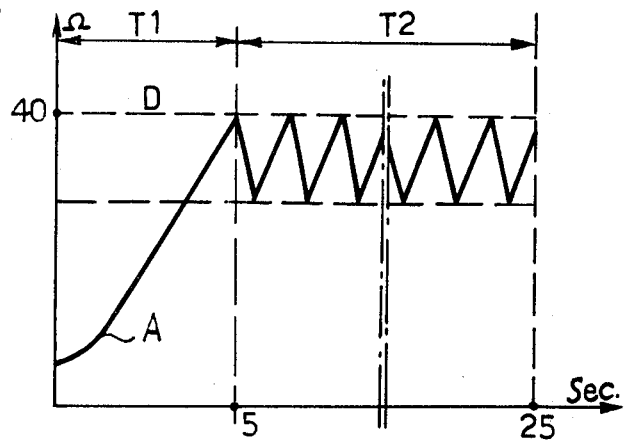
FIGS. 7, 8 and 9 are mutually correlated diagrams, on which the axes of abscissae denote the heating time, while the ordinates in FIG. 7 denote instantaneous resistance values of the PTC resistor, the ordinates in FIG. 8 denote the temperature of the liquid being heated, and the ordinates in FIG. 9 denote the instantaneous heating power of the PTC resistor.
Figure 8:
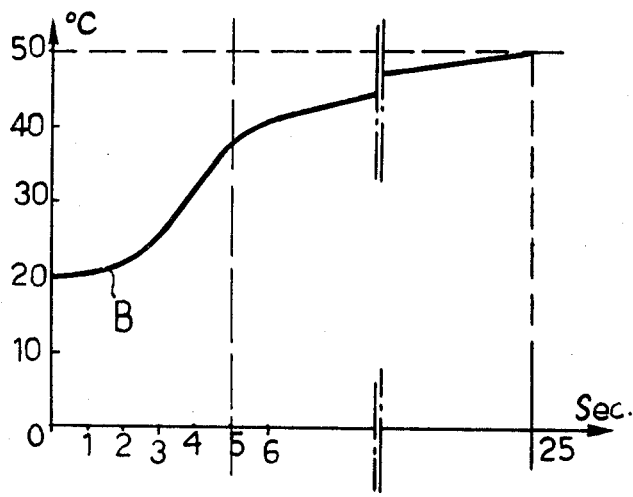
Figure 9:
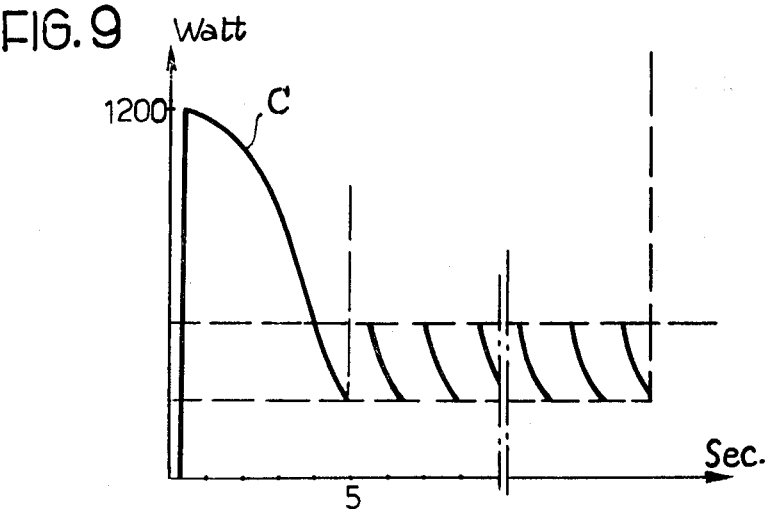

The heating process is illustrated by diagrams of FIGS. 7-9 and comprises a basic heating time T1 under continuous delivery of heating power (curve C, FIG. 9) and a supplemental heating time T2 under intermittent delivery of heating power making together the total heating time counted by the timer circuit mentioned hereinbefore. At the start, the ohmic value (curve A, FIG. 7) of the heating PTC resistor is low, the coffee temperature (curve B, FIG. 8) is at its ambient value, and the heating power (curve C) jumps to its peak value of, say, 1200 Watts, thereby to rapidly deliver substantial amounts of heat at increasing temperature of the heating resistor. The basic heating time T1 elapses when the heating resistor temperature reaches its maximum value admissible for the cup 5, corresponding to a maximum ohmic value D (FIG. 7). It may be assumed that said maximum temperature is about 400° C. and said maximum ohmic value is about 40 ohms. The PTC heating resistor is advantageously proportioned so as to produce in the liquid a rise of temperature of at least ½ (preferably of about ⅔) of the required total increase. Thus, according to FIG. 8, the coffee in the cup 5 reaches about 35°-40° C. It is the task of the control circuit mentioned hereinbefore to sense the resistance value of the PTC resistor 13D in this period and to interrupt energization of the resistor when said value eaches the maximum value D (exemplified as 40 ohms). It is also the task of said control circuit to restore the energization of the heating resistor within a small fraction of the heating time and to again deenergize the resistor at the value D, and to continue this process until the coffee in the cup reaches its consumption temperature (50° C., FIG. 8). It will be seen in FIGS. 7 and 9 that this process is effected in the low power region (FIG. 9) of the PTC resistor, that is, within a restricted range of ohmic values adjacent (from below) to the maximum value D corresponding to the maximum temperature value. The frequency of these interruptions and reinsertions is preferably more than one per second. For example, in a pratical embodiment, the interruption periods are of about 0.2 seconds and the energization periods are of about 0.3 seconds. The moment of elapse of T2 (that is, practically, the total heating time T1+T2) is predetermined experimentally by the designer of the device. In the case represented by FIGS. 7-9 the temperature of the coffee in the cup reaches its consumption value after 25 seconds, and the timer circuit is designed or pre-set correspondingly.

Figure 10:
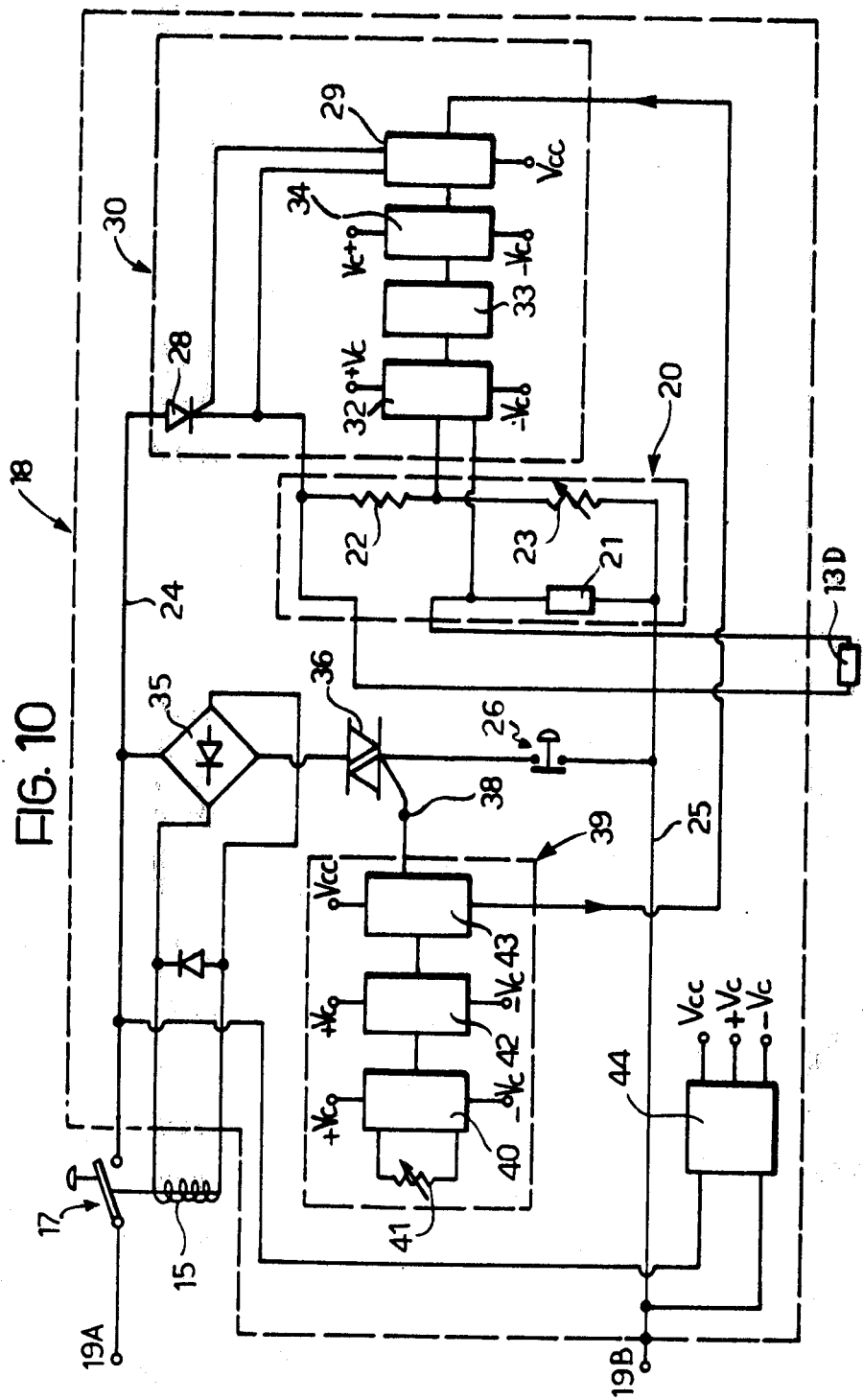
FIG. 10 is an example of an electric scheme of the device of FIGS. 1–5 putting into practice the conditions shown in FIGS. 7–9.

In the circuit diagram of FIG. 10, references 19A, 19B denote connection terminals in the socket 16. The microswitch is still denoted by 17 and is connected to terminal 19A. References 15 and 18 still denote the electromagnets and the box enclosing the circuits, respectively. The outlet contact of the microswitch is connected to an inlet conductor 24 in the box, while the terminal 19B is connected to an inlet conductor 25 in the box. The supply voltage is 220 V alternating current. The conductors 24, 25 are interconnected by a series connection of a rectifier bridge 35, a TRIAC or a Silicon Controlled Rectifier (SCR) 36 and an emergency interrupter 26. The excitation windings of the electromagnets 15 are directly connected to the D.C. terminals of the rectifier bridge 35. The conduttors 24, 25 are also directly connected to a D.C. voltage supply circuit 44, comprising two outlets for stabilized and balanced D.C. voltages +Vc and −Vc, and an outlet for a non-stabilized D.C. voltage Vcc, all for the timer circuit 39 and the control circuit 30. The conductors 24, 25 are further directly interconnected by a series connection of a half-wave SCR rectifier 28 and of a Wheatstone bridge 20. The inlet terminals of the bridge 20 are interconnected by a series connection of the PTC heating resistor 13D and a resistor 21, as well as by a series connection (in parallel with the former) of a resistor 22 and a variable balancing resistor 23, the latter being in the branch of the bridge opposite the branch formed by the PTC resistor 13D. The outlet terminals of the Wheatstone bridge (the "measuring diagonal") are connected to the control circuit 30.

More particularly, said terminals are connected to the inlet terminals of an operational amplifier 32, which amplifies the D.C. voltage signal present at the ends of the said measuring diagonal of the Wheatstone bridge. Obviously, said voltage signal is indicative of the instantaneous resistance value of the PTC resistor 13D in operation. The amplified signal is supplied to an integrator 33 of resistance-capacitance (R-C- type, whereby a sloping D.C. voltage appears at the outlet of the integrator and is fed to a voltage comparator circuit 34, which latter controls a unijunction transistor oscillator 29 controlling on its turn the SCR rectifier 28. The latter is conductive until the signal supplied to the voltage comparator 34 reaches a predetermined threshold value; at the latter instant the comparator 34 causes the oscillator 29 to inhibit the SCR rectifier 28, whereby the supply of heating current to the PTC resistor 13D is temporarily interrupted. The said threshold value obviously corresponds to the maximum ohmic value D (FIG. 7) of the PTC resistor and, therefore, to the maximum admissible temperature of the heating plate. The resistance and capacitance values in the circuits 33 and 29 are proportioned such that the SCR rectifier is reactivated by the circuit 29 within a convenient period (such as the 0.2 seconds suggested hereinbefore).

The control terminal 38 of the TRIAC or SCR 36 is connected to the timer circuit 39. The latter comprises an integrator (slope generator) circuit 40 including a variable resistor 41, for the purpose of generating a continuously increasing D.C. voltage signal; the resistor 41 serves to adjust the time necessary for said signal to reach a predetermined threshold value. The signal is delivered to a voltage comparator circuit 42, similar to the circuit 34, in which the signal is compared with a threshold value. The signal resulting from the comparison is delivered to a TRIAC-control circuit 43, which inhibits the TRIAC 36 when the signal from the circuit 40 reaches the said threshold value. The consequence of the inhibition is that the current flow through the rectifier bridge is interrupted, whereby the electromagnets 15 are de-energized, the arm 8 (FIGS. 1-5) is released and the microswitch 17 is released to its open condition; at this instant the heating process is definitely terminated.

In operation, starting from the closure of the microswitch 17 by the arm 8, the timer circuit initiates its timing routine and at the same instant the PTC resistor starts its heating process since the SCR diode 28 is not inhibited by the circuit 29. The first inhibition occurs when the instantaneous resistance value of the PTC resistor reaches its maximum value D (FIG. 7) determined by the variable resistor 23, whereupon the control circuit 30 initiates its "on" and "off" routine (time T2 in FIG. 7). This routine would go ahead indefinitely, and the coffee temperature (FIG. 8) in the cup 5 would consequently rise indefinitely; however, at the elapse of time (25 seconds in FIGS. 7-9) necessary to reach the consumption temperature (50° C.) the timer circuit 39 intervenes and definitely interrupts the heating process, as explained hereinbefore. In case of failure, it is sufficient for the user momentarily depress the push-botton emergency switch 26.

Figure 11:
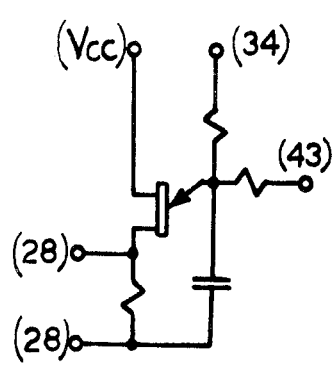
FIGS. 11 through 16 show details of the scheme of FIG. 10.
Figure 12:
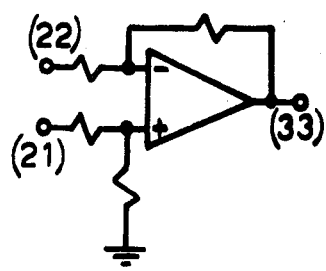
Figure 13:
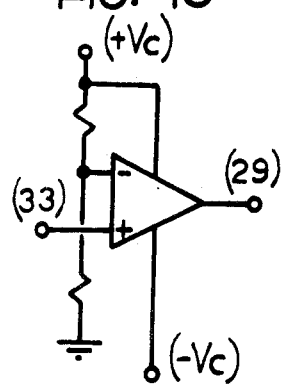
Figure 14:
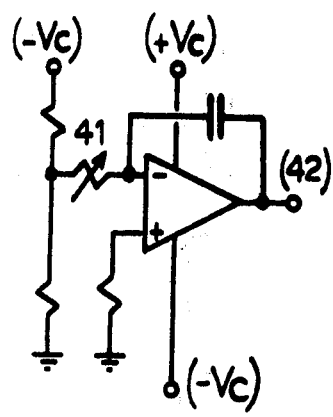
Figure 15:
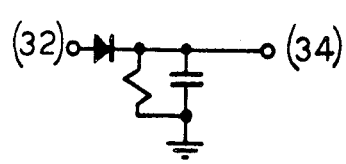
Figure 16:
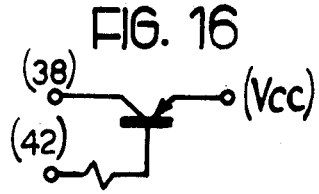

Details of the circuits 29 and 32 are shown in FIGS. 11 and 12, respectively. FIG. 13 shows details of the voltage comparator circuits 34 and 42. FIGS. 14, 15 and 16 show details of circuits 40, 33 and 43, respectively. The numerals in the brackets in FIGS. 11-16 denote the parts to which the relevant terminals are connected in the general scheme of FIG. 10. It is also to be noticed that the inibition circuit 29 corresponds to FIGS. 13-22, page 501, of the handbook by Millman and Taub "Pulse, Digital and Switching Waveforms," Ed. 1965 (McGraw Hill, New York). The circuits 32, 34, 42 and 40 correspond to those illustrated and described on pages 20-3, 4-2 and 20-4, of "Linear Applications" 1973, Vol. 1, edited by National Semiconductor Corporation, California.

Figure 19:
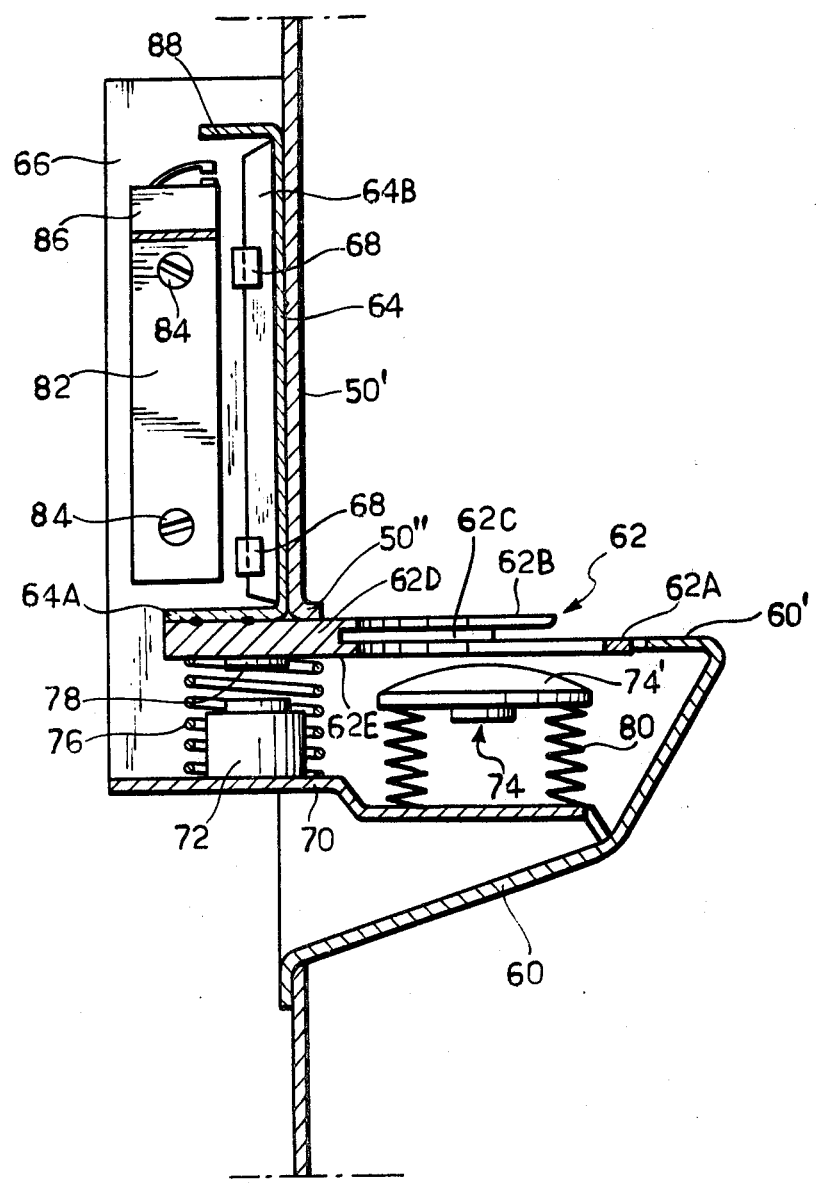
FIG. 19 is a vertical cross-sectional view on line XIX—XIX of FIG. 18.

In the embodiment shown in FIGS. 17-19, reference 50 denotes a coin-actuated dispensing apparatus of a vertical parallelepipedic form, having in its front wall a slot 52 for introduction of a coin and a delivery window 54 from which the customer may pick-up a coffee-containing sealed cup 5. The filled cups are stored in the apparatus in unheated or cool condition.

Two heating devices 58 constructed according to this invention are associated with each of the side walls 50' of the apparatus. If the customer wishes a hot coffee, rather than a cool one, he will use one of these devices. The devices are identical with each other, so that one of them only will be described hereinbelow.

Part of the device is housed by a hollow console 60 of sheet metal, fitted to an aperture in the wall 50' visible in FIG. 19. The console comprises a planar horizontal upper wall 60', with an aperture 60" therein for the presser member. The presser member, denoted by 62, is similar to that of FIGS. 1-5 and comprises a planar bearing ring 62A flush with the upper surface of the wall 60', a flange 62B overhanging the ring, and a semi-circular groove 62C formed by the ring and flange. The ring and flange merge rearwardly into a plate 62D protruding into the inside of the apparatus 50. The plate 62D is spot-welded to a horizontal bracket 64A of a slide 64 stamped of sheet metal, the slide extending vertically upwardly and sliding vertically on the inner face of the wall 50'. More particularly, the slide comprises a rectangular piece of sheet metal comprising two opposite vertical edges 64B bent rearwardly at right angle. These edges slide vertically in contact with respective vertical flanks 66 of sheet metal fixed perpendicularly to the inner face of the wall 50'. The slide is kept in sliding contact with the wall 50' by pairs of guide tabs 68 which are rigid with the respective flanks 66 and cooperate with the respective edges 64B of the slide. Also rigid with the flanks 66 is a base plate 70, bridging the flanks and protruding forwardly into the console 60. The rear portion of the base plate 70 rigidly carries an electromagnet 72 at a location directly below the plate 62D, and the latter has fixed to its lower face 62E a flat block 78 of ferromagnetic material providing an armature for the electromagnet. Preferably also the plate 62D and the presser member 62 are of ferromagnetic metal. The electromagnet 72 has its core directed vertically and is surrounded by a helical compression spring 76 reacting against the base plate 70 and urging the plate 62D into contact with an end stop constituted by a transverse horizontal lip 50" bent outwardly from the wall 50'. The heating plate, denoted by 74, is similar to that shown in FIGS. 1-5; it comprises a convex heating face 74' turned upwardly and is resiliently supported by the base plate 70 by means of three vertically extending helical compression springs 80. The heating plate 74 is coaxial with the circular aperture in the ring 62A, as in FIGS. 1-5.

The electric circuits are housed by a flat rectangular vertical box 82 removably supported by the flanks 66 by means of screws 84. The box 82 carries at its upper end wall a microswitch 86 equivalent to the microswitch 17 described hereinbefore. To close the switch, the slide 64 has at its upper end a bracket 88 horizontally extending over the switch. The electrical components and connections are similar to those described with reference to FIGS. 1-16.

In operation, a cup 5 in inverted position is placed onto the wall 60' of the console 60 and slid with its flange into the groove 62C, whereupon a hand pressure exerted downwardly on the cup produces vertical downward translation of the presser member 62 with its slide 64 until the heating plate 74 is lowered against the action of its springs 80. At this instant the armature 78 is close to the core of the electromagnet 72 and, moreover, the microswitch is closed by the bracket 88, whereby the electromagnet is energized and keeps the slide in its depressed position. The heating process is as described hereinbefore. When the timer circuit enclosed by the box 82 determines the end of the process, the electromagnet 72 is de-energized, whereby the slide is released and the bracket 88 releases the switch 86 to its open condition. As, under the action of the return spring 76, the presser member with its carried cup is raised to its original position (FIG. 19), the bearing ring is again flush with the wall 60' so that the cup may be horizontally withdrawn by the consumer from the presser member 62.

It is to be understood that in addition to the embodiments described hereinbefore many further embodiments will appear obvious to those skilled in the art, all lying within the scope of this invention. It is also to be understood that the term "horizontal" as used herein with reference to the presser member and its adjacent parts must not be construed "strictu sensu" because even a somewhat inclined presser member and heating plate will obviously be effective as long as the liquid in the cup or container completely covers the wall portion of the latter (e.g. the cover of the cup) in contact with the heating plate.

As regards the container and the corresponding form of the presser member, it is to be understood that the flange 5A on the container and its corresponding retaining groove in the presser member merely constitute the most typical and convenient aspect of this invention, without excluding other possibilities. Thus, for example, depending upon the actual form of the container, the presser member may not comprise the flange 4B or 62B but, rather, may be shaped so as to embrace the container from upward, or so as to engage with a circumferential rib or depression on the container body, while still performing its funcion according to this invention mainly consisting of (a) producing and maintaining a pressure contact between the container and heating plate during the whole heating time and (b) removing the container from the heating plate at the end of the process thereby to make the container available to the consumer.

What is claimed is:

1. Device for heating to consumption temperature a liquid commestible product while the latter is sealed in a disposable shaped container having a heat-conductive wall portion, comprising:
   (i) a normally open electric switch,
   (ii) a yieldably supported heating plate having a heating face and a PTC heating resistor energizable via said switch,
   (iii) a spring-biased presser member formed with a container-receiving seat located above said heating face, said member being manually depressable against the action of its bias spring from a loading position spaced above said face to a working position to bring said wall portion of the container into forced pressure-engagement with the heating face,
   (iv) the said normally open electric switch being closable by displacement of the presser member to said working position,
   (v) a fixed electromagnet unit energizable by closure of the switch and a movable armature for said electromagnet unit carried by the presser member in a mutual relation such that the presser member is kept in its working position by the electromagnet unit when the latter is energized,
   (vi) an electric control circuit controlling heating current supply to the PTC resistor from said switch when the latter is in closed condition, said control circuit comprising circuit means sensitive to the instantaneous resistance value of the PTC resistor in energized condition thereby to interrupt the said heating current supply each time the temperature of the resistor rises to a predetermined maxim value and to restore said current after a fraction of the total heating time, (vii) and a timer circuit triggerable by the closure of said switch, determining the total heating time and arranged to open said switch at the elapse of the total heating time.

2. A device as claimed in claim 1, wherein said heating face is a substantially circular, convex surface.

3. A device as claimed in claim 1, wherein said presser member and seat comprise an annular bearing portion for the container substantially coaxial with the heating plate, a fork-shaped flange fast with and overlying a part of said bearing portion, and an inwardly open groove formed jointly by said bearing portion and flange to provide a half-circumferential pocket capable of receiving a flange formed on the container.

4. A device as claimed in claim 1, wherein the presser member constitutes the free end of a lever arm having its opposite end fast with a leaf spring supporting the arm and constituting the bias spring for the presser member.

5. A device as claimed in claim 4, wherein the armature comprises a ferromagnetic bar crossing the lever arm, and wherein the fixed electromagnet unit comprises two electromagnets operatively arranged beneath the respective end portions of said bar, whereby the presser member is kept in its working position by the joint attraction force of the two electromagnets.

6. A device as claimed in claim 4, further comprising the said switch located fixedly beneath the said lever arm at a distance enabling the lever arm to close the switch when the presser member is depressed to its working position.

7. A device as claimed in claim 1, moreover comprising a substantially vertical, fixed frame wall, a slide vertically slidable on said frame wall, and the said presser member and armature being rigid with said slide in an arrangement wherein the presser member extends from the slide to its location above the heating plate.

8. A device as claimed in claim 7, wherein the presser member and armature are carried by the lower end of the slide, the fixed electromagnet unit comprises a fixed electromagnet operatively located beneath the armature, and a helical compression spring coaxially encircling the elctromagnet is provided to bias the slide to an upper stop position at which the presser member is in its loading position.

9. A device as claimed in claim 1, wherein the PTC resistor is the sole heating resistor in the said heating plate.

10. A device as claimed in claim 1, wherein the timer circuit comprises means for selectively setting the total heating time.

11. A device as claimed in claim 1, comprising a Weatstone bridge connected to said switch in which one of the four branches comprises the said PTC heating resistor; and the said control circuit connected to the ends of the measuring diagonal of the bridge.

12. A device as claimed in claim 11, moreover comprising a controlled rectifier connected in series with the Wheatstone bridge with respect to the switch whereby the bridge is energized by direct current pulsations, and the said control circuit having its output connected to the control terminal of said controlled rectifier to inhibit the latter when the instantaneous resistance value of the PTC resistor reaches its predetermined maximum value.

13. A device as claimed in claim 1, wherein the said fraction of the total heating time is a fraction of a second.

* * * * *